US008401123B2

(12) United States Patent
Swarts et al.

(10) Patent No.: US 8,401,123 B2
(45) Date of Patent: Mar. 19, 2013

(54) METHOD AND SYSTEM FOR INCREASING THE ACCURACY OF FREQUENCY OFFSET ESTIMATION IN MULTIPLE FREQUENCY HYPOTHESIS TESTING IN AN E-UTRA/LTE UE RECEIVER

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 488 days.

(21) Appl. No.: 12/510,901

(22) Filed: Jul. 28, 2009

(65) Prior Publication Data

US 2011/0026648 A1 Feb. 3, 2011

(51) Int. Cl.
*H04L 27/06* (2006.01)
(52) U.S. Cl. .......................... 375/340; 375/343; 370/336
(58) Field of Classification Search .................. 370/252, 370/280, 330, 336, 350; 375/149, 260, 294, 375/340, 343, 359; 455/265, 310, 455.1
See application file for complete search history.

(56) References Cited

U.S. PATENT DOCUMENTS

| | | | |
|---|---|---|---|
| 8,059,767 B2 | 11/2011 | Furman et al. | |
| 2002/0054624 A1 | 5/2002 | Boloorian | |
| 2003/0012268 A1 | 1/2003 | Doetsch et al. | |
| 2003/0099206 A1* | 5/2003 | Jones et al. | 370/280 |
| 2004/0062298 A1 | 4/2004 | McDonough et al. | |
| 2005/0238087 A1 | 10/2005 | Yang et al. | |
| 2007/0218854 A1 | 9/2007 | Lawrence et al. | |
| 2008/0019350 A1* | 1/2008 | Onggosanusi et al. | 370/350 |
| 2008/0090600 A1* | 4/2008 | Demir et al. | 455/502 |
| 2009/0017768 A1* | 1/2009 | Makarov | 455/67.13 |
| 2009/0034501 A1 | 2/2009 | Hahm et al. | |
| 2009/0034589 A1 | 2/2009 | Hahm et al. | |
| 2009/0041162 A1* | 2/2009 | Li et al. | 375/340 |
| 2009/0086713 A1 | 4/2009 | Luo | |
| 2009/0219883 A1 | 9/2009 | Cho et al. | |
| 2010/0098031 A1 | 4/2010 | Charbit | |
| 2010/0128824 A1 | 5/2010 | Hui | |
| 2010/0158079 A1 | 6/2010 | Li et al. | |
| 2010/0182979 A1* | 7/2010 | Malladi et al. | 370/336 |
| 2011/0026413 A1 | 2/2011 | Swarts et al. | |
| 2011/0026649 A1 | 2/2011 | Lipka et al. | |
| 2011/0151817 A1 | 6/2011 | Swarts et al. | |
| 2011/0223901 A1 | 9/2011 | Swarts et al. | |

\* cited by examiner

*Primary Examiner* — Leon-Viet Nguyen
(74) *Attorney, Agent, or Firm* — Sterne, Kessler, Goldstein & Fox PLLC

(57) ABSTRACT

A mobile device receives a radio frequency (RF) signal comprising a primary synchronization sequence (PSS) and a secondary synchronization sequence (SSS). The mobile device performs multiple frequency hypothesis (MFH) testing via multiple MFH branches. A PSS correlation process is performed for each MFH branch. Frequency offset for receiving data is estimated using resulting correlation data. A desired offset is placed in each MFH branch. A baseband signal is frequency offset per MFH branch according to the desired frequency offset before the PSS correlation process. A received PSS is detected based on a maximum PSS correlation over the entire set of MFH branches. A frequency offset is estimated for the MFH branch associated with the detected PSS by combining an associated residual frequency with a corresponding desired offset. The frequency offset estimate is used for baseband signal processing and/or adjusting a reference oscillator frequency at the mobile device.

20 Claims, 6 Drawing Sheets

METHOD AND SYSTEM FOR INCREASING THE ACCURACY OF FREQUENCY OFFSET ESTIMATION IN MULTIPLE FREQUENCY HYPOTHESIS TESTING IN AN E-UTRA/LTE UE RECEIVER

CROSS-REFERENCE TO RELATED APPLICATIONS/INCORPORATION BY REFERENCE

Not Applicable.

FIELD OF THE INVENTION

Certain embodiments of the invention relate to communication systems. More specifically, certain embodiments of the invention relate to a method and system for increasing the accuracy of frequency offset estimation in multiple frequency hypothesis testing in an E-UTRA/LTE UE receiver.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE/E-UTRA is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as antenna configuration indicator, full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for increasing the accuracy of frequency offset estimation in multiple frequency hypothesis testing in an E-UTRA/LTE UE receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for increasing the accuracy of frequency offset estimation in multiple frequency hypothesis testing generated in an E-UTRA/LTE UE receiver. A mobile device is operable to receive a radio frequency (RF) signal from an associated base station. The received signal may comprise a PSS and a SSS, which may be used by the mobile device to acquire cell-specific parameters via the PSS synchronization and the SSS detection, respectively. To overcome or mitigate uncertainties related to the correct PSS symbol timing and/or the correct frequency offset for the received PSS, the mobile device may be operable to perform multiple frequency hypothesis (MFH) testing.

The mobile device may be operable to perform the MFH testing using a set of MFH branches. The mobile device may be operable to perform a PSS correlation process for each of the MFH branches in the set. The resulting correlation data may be utilized for estimating carrier frequency offset that exists between the associated base station and the UE local oscillator. The frequency offset may be estimated based on corresponding PSS correlation data in a MFH branch producing a maximum PSS correlation peak magnitude across the entire set of MFH branches. The mobile device may be operable to determine a desired offset for each of the MFH branches. A distinct frequency offset may be applied to a baseband signal of the received PSS in each of the MFH branches based on a corresponding desired frequency offset. The PSS correlation processing may be performed after the signal frequency offsetting in each of the branches. The mobile device may be operable to select a candidate PSS for the received PSS in each of the MFH branches based on corresponding resulting PSS correlation peak magnitudes. The received PSS may be detected from the selected candidate PSSs in the set of MFH branches. The detected PSS may be associated with the maximum PSS correlation peak magnitude across the entire set of MFH branches. A residual frequency offset may be estimated using the corresponding PSS correlation data for the MFH branch, which produces a maximum PSS correlation peak magnitude across the entire set of MFH branches. The estimated residual frequency offset may be combined with the corresponding desired frequency offset in the MFH branch to provide a frequency offset estimate for the mobile device. The resulting frequency offset may be used for further baseband processing. The resulting frequency offset may also be used to adjust a reference oscillator frequency in an associated E-UTRA/LTE UE receiver of the mobile device.

Figure 1:
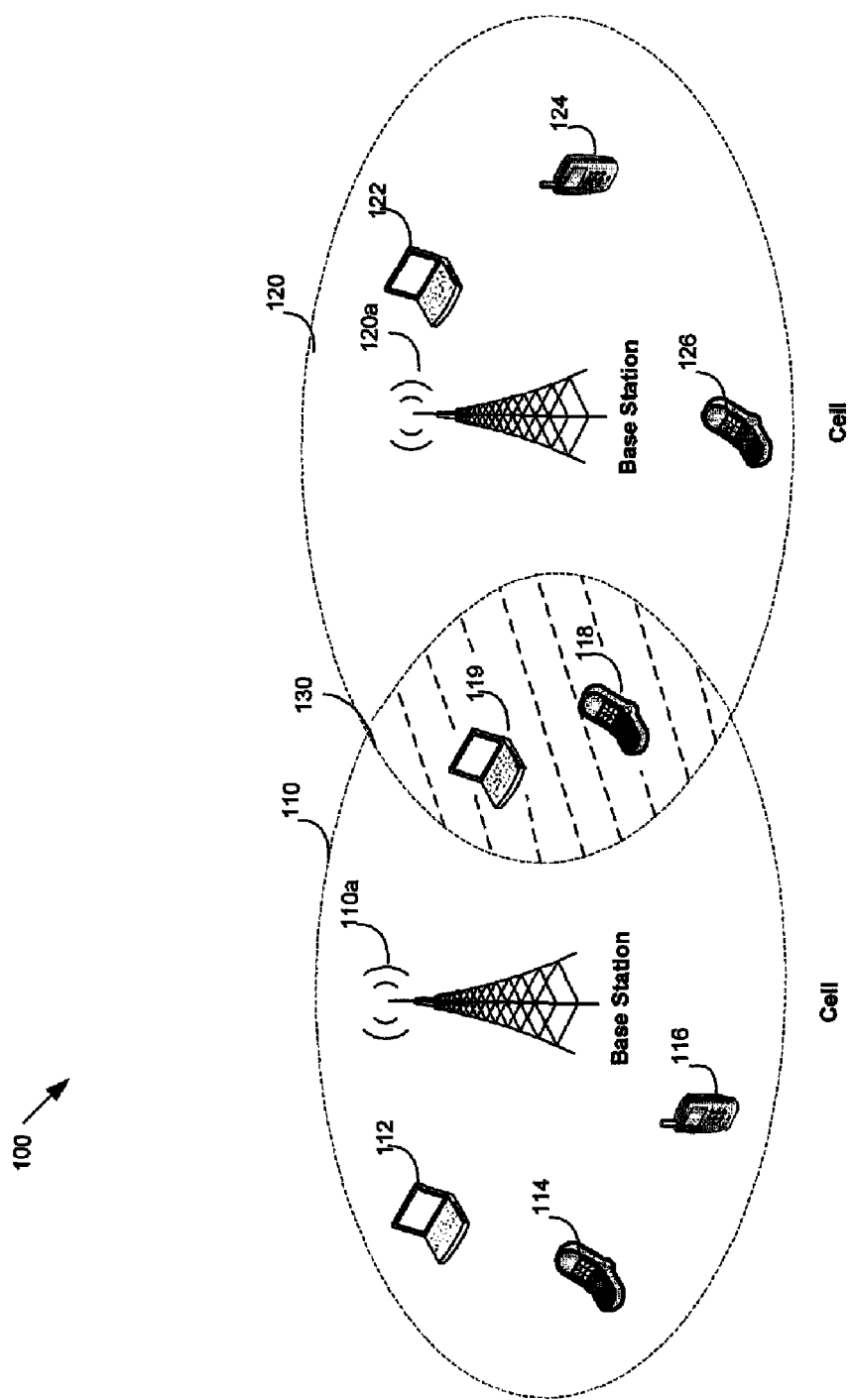
FIG. 1 is a diagram illustrating an exemplary LTE/E-UTRA communication system that is operable to increase the accuracy of frequency offset estimation in multiple frequency hypothesis testing in an E-UTRA/LTE UE receiver, in accordance with an embodiment of the invention.

FIG. 1 is a diagram illustrating an exemplary LTE/E-UTRA communication system that is operable to increase the accuracy of frequency offset estimation in multiple frequency hypothesis testing in an E-UTRA/LTE UE receiver, in accordance with an embodiment of the invention. Referring to FIG. 1, there is shown a LTE/E-UTRA communication system 100. The LTE/E-UTRA communication system 100 comprises a plurality of cells, of which cells 110-120 are displayed. A LTE/E-UTRA coverage area 130 is the overlapped coverage area of the cell 110 and the cell 120. The cell 110 and the cell 120 are associated with a base station 110a and a base station 120a, respectively. The LTE/E-UTRA communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped LTE/E-UTRA coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as synchronization signals may not carry information from higher layers. In the LTE/E-UTRA standard, the base station 110a may be operable to transmit a primary synchronization signal (PSS) and a secondary synchronization signal (SSS).

The base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence. The scrambling code may be linked or mapped to, for example, the index of the PSS. After successful time and frequency synchronization via the PSS synchronization, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs is base station or cell specific.

The mobile device 118 may be operable to detect or select a particular PSS from the received plurality of PSSs to acquire PSS synchronization. The detected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively.

In accordance with an exemplary embodiment of the invention, the PSS correlation data may be accumulated over one or several time slot duration. The resulting correlation peaks may be utilized as an indication of the possible PSS symbol timing hypotheses under consideration. Accordingly, the mobile device 118 may be operable to detect the particular PSS according to the resulting correlation peaks. Furthermore, the mobile device 118 may be operable to utilize the PSS correlation data to estimate a local oscillator frequency offset of the mobile device 118 relative to a carrier frequency associated with the PSS transmission. Due to, for example, oscillator inaccuracy, there may be a wide range of uncertainty in the correct PSS symbol timing and/or the correct local oscillator frequency for the mobile device 118. The uncertainties for the correct PSS symbol timing and/or the local oscillator frequency offset for the mobile device 118 may cause the mobile device 118 to fail to detect the particular PSS in instances when the frequency offset is large. Furthermore, the uncertainties may also cause the mobile device to erroneously detect the particular PSS when none may be present, or detect the particular PSS but fail to estimate the correct PSS symbol timing and/or the frequency offset, thereby resulting in an inability to properly establish synchronization between the base station 110a and the mobile device 118. In this regard, the mobile device 118 may be operable to perform multiple frequency hypothesis testing for accurate frequency offset estimation. A set of desired frequency offsets may be selected within a required frequency uncertainty range such as, for example, +/−15 ppm. One desired frequency offset may be placed in each multiple frequency hypothesis (MFH) branch in the multiple frequency hypothesis testing, in such a manner as to evenly cover the desired frequency uncertainty range of, for example, +/−15 ppm.

The resolution of the selected desired offsets may be determined based on available resources such as available memory within the mobile device 118. A received downlink signal frequency may be adjusted or offset for each of the MFH branches according to corresponding selected desired frequency offset. Signal frequency adjustment or frequency offsetting may be achieved via frequency mixing. The mobile device 118 may be operable to perform a PSS correlation process for each of the MFH branches after frequency mixing. In each MFH branch, the PSS correlation data may be accumulated over one or several time slots, for example. The resulting PSS correlation peaks (possible PSS symbol timing hypothesis) may be compared and based on the comparison, a candidate PSS may be selected for each of the MFH branches for the received PSS. The candidate PSS for each of the MFH branches may be selected based on the maximum correlation peak in a corresponding MFH branch. The desired frequency offset in a MFH branch producing a maximum PSS correlation peak magnitude across the entire set of MFH branches may indicate a coarse frequency offset estimate that may exist between the carrier frequency of the base station 110a and the local oscillator frequency of the mobile device 118. In this regard, the desired frequency offset in the MFH branch with the maximum PSS correlation peak magnitude may be combined with a corresponding residual frequency offset in the MFH branch for accurate frequency offset estimation between the carrier frequency of the base station 110a and the local oscillator frequency of the mobile device 118. The residual frequency offset estimation may be performed using the corresponding PSS correlation data in the MFH branch with the maximum PSS correlation peak magnitude.

The received particular PSS may be detected from the selected candidate PSSs according to the highest PSS correlation peak magnitude. The position of the highest PSS correlation peak magnitude may indicate the starting position of the detected PSS and provide the PSS symbol timing for the detected PSS in the corresponding cell such as the cell 110. The detected PSS, the PSS symbol timing, and/or the frequency offset estimation may be utilized by the mobile device 118 for the SSS detection for cell specific information such as, for example, frame boundary and/or Cell ID group indicator.

In an exemplary operation, the base station 110a may be operable to perform communications within the cell 110 using physical channels and physical signals such as a PSS and a SSS. The base station 110a may be operable to transmit base station specific PSS and SSS, regularly, for example, every 5 ms. To communicate with the base station 110a, a mobile device such as the mobile device 118 may be operable to acquire the PSS and SSS received from the base station 110a so as to determine one or more transmission parameters. For example, the mobile device 118 may be operable to acquire PSS synchronization to identify the PSS symbol timing and estimate a channel. The resulting channel estimates and the identified PSS symbol timing may be used to detect the received SSS for cell specific parameters such as frame boundary synchronization and/or cell group information.

The mobile device 118 may be operable to perform multiple frequency hypothesis testing to acquire PSS symbol timing and/or frequency offset. The multiple frequency hypothesis testing may start with a set of desired frequency offsets within the desired frequency uncertainty range such as, for example, +/−15 ppm. The mobile device 118 may be operable to assign one unique desired frequency offset to each of the MFH branches in a manner which evenly covers the entire desired frequency uncertainty range of, for example, +/−15 ppm. Each MFH branch may be assigned a unique desired frequency offset. In each MFH branch, the frequency of a received baseband signal may be offset by the assigned desired frequency offset. A PSS correlation process may be performed on the received baseband signal with the assigned desired frequency offset to acquire the received PSS. A candidate PSS for the received PSS may be selected according to the maximum resulting PSS correlation peak magnitude in each MFH branch. The received PSS may be detected from the selected candidate PSSs according to the maximum PSS correlation peak magnitude across the entire set of MFH branches. A residual frequency offset may be estimated using PSS correlation data in the MFH branch with the maximum PSS correlation peak magnitude across the entire set of MFH branches. The resulting residual frequency offset estimate may be combined with the desired frequency offset in the MFH branch with the maximum PSS correlation peak magnitude across the entire set of MFH branches to provide frequency offset estimation between the carrier frequency of the base station 110a and the local oscillator frequency of the mobile device 118. The position of the maximum PSS correlation peak magnitude across the entire set of MFH branches may indicate the PSS symbol timing for the received PSS.

Figure 2:
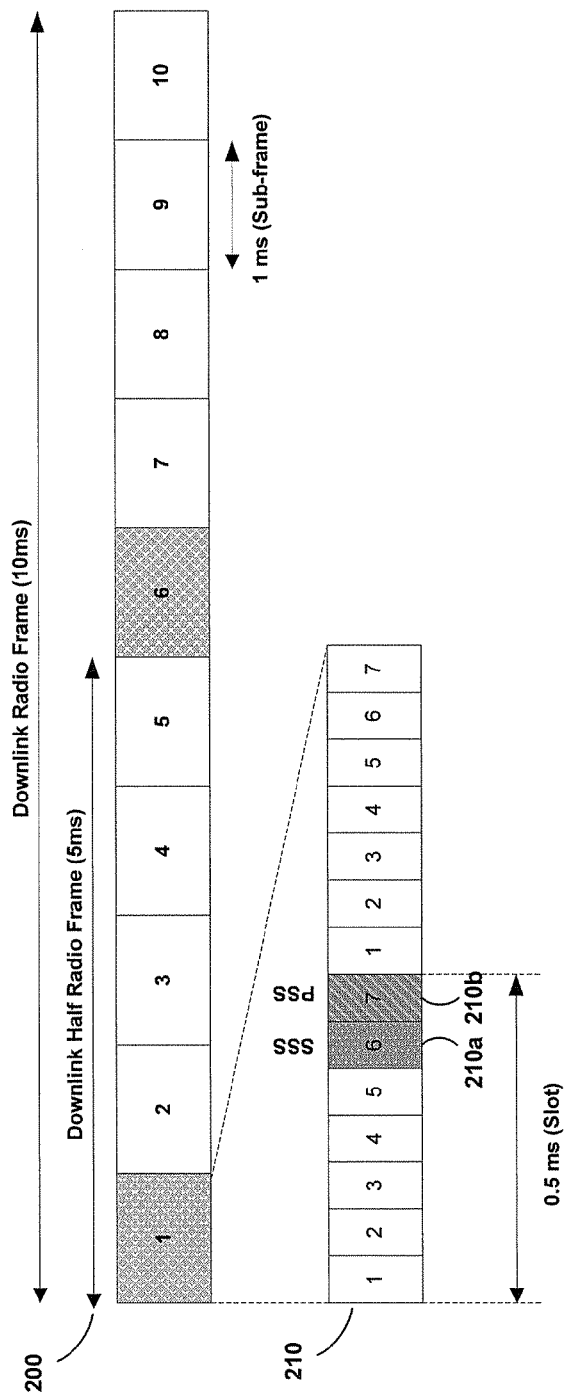
FIG. 2 is a block diagram of an exemplary E-UTRA/LTE downlink synchronization signal structure, which is utilized in accordance with an embodiment of the invention.

FIG. 2 is a block diagram of an exemplary E-UTRA/LTE downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated cell ID and/or antenna configuration.

The PSS 210a and the SSS 210b may be transmitted on sub-frame 0 and 5 of the downlink radio frame 200 and occupy two consecutive symbols in a corresponding sub-frame. The PSS 210a may be used to identify the symbol timing and the cell ID within a cell ID group. The SSS 210b may be used for identifying frame boundary, detecting cell ID group, and/or acquiring system parameters such as cyclic prefix (CP) length. The SSS detection for the SSS 210b may start after a successful PSS synchronization on the PSS 210a. The PSS synchronization may provide timing and frequency offset information for the downlink radio frame 200. To acquire accurate timing and frequency offset for the downlink radio frame 200, multiple frequency hypothesis testing may be performed. A PSS correlation process for the PSS 210a may be combined in each MFH branch with the frequency offset estimation. A desired frequency offset may be placed on a baseband signal associated with the PSS 210a in each MFH branch via frequency mixing prior to the PSS correlation process in each MFH branch. Accurate frequency offset estimation may be achieved for each of the MFH branches by combining the desired or applied frequency offset with a residual estimated frequency offset in the MFH branch. The residual frequency offset may be derived for each of the MFH branches from corresponding PSS correlation data. Overall frequency offset estimates for the downlink radio frame 200 may be identified once the PSS 210a is detected.

Figure 3:
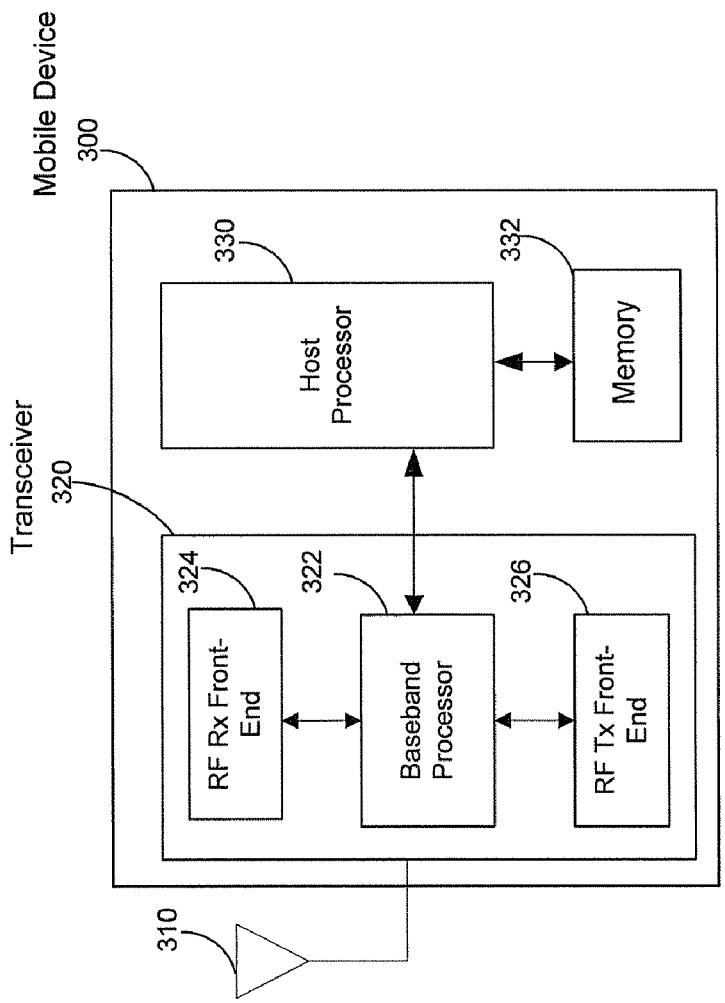
FIG. 3 is a block diagram of an exemplary mobile device that may be operable to increase the accuracy of frequency offset estimation in multiple frequency hypothesis testing in an E-UTRA/LTE UE receiver, in accordance with an embodiment of the invention.

FIG. 3 is a block diagram of an exemplary mobile device that may be operable to increase the accuracy of frequency offset estimation in multiple frequency hypothesis testing in an E-UTRA/LTE UE receiver, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring correct PSS timing and/or frequency offset.

Various factors such as, for example, propagation delay, Doppler shift, and/or oscillator drift, may cause a wide range of uncertainties on the correct PSS symbol timing and/or frequency offset. In this regard, the baseband processor 322 may be operable to perform multiple frequency hypothesis testing for accurate PSS symbol timing and/or frequency offset estimation. A PSS correlation process may be performed for each of the MFH branches with the frequency offset estimation. The baseband processor 322 may start the multiple frequency hypothesis testing with a set of desired frequency offsets. The set of desired frequency offsets may be selected in a manner which evenly covers the frequency uncertainty range such as, for example, +/−15 ppm. Each MFH branch may be associated with a specific desired or applied frequency offset selected by the baseband processor 322. The specific desired frequency offset may be applied to an associated baseband signal of the received PSS for each of the MFH branches by frequency mixing.

The baseband processor 322 may be operable to perform a PSS correlation process on the signal with a desired offset. In this regard, a candidate PSS for the received PSS may be selected for all of the MFH branches according to the resulting PSS correlation peak magnitudes over the set of MFH branches. The received PSS may be detected from the selected candidate PSSs according to the maximum PSS correlation peak magnitude across the entire set of MFH branches. The position of the maximum PSS correlation peak magnitude across the entire set of MFH branches may provide the PSS symbol timing for the received signal. The baseband processor 322 may also be operable to determine a residual frequency offset for the MFH branch producing the maximum correlation peak magnitude across the entire set of MFH branches using corresponding PSS correlation data. The resulting residual frequency offset estimate may be combined with a corresponding applied or desired frequency offset in the MFH branch to provide frequency offset estimation between the carrier frequency of the base station 110a and a reference or local oscillator frequency of the mobile device 300. The baseband processor 322 may be operable to adjust the reference or local oscillator frequency based on the frequency offset estimate. After a successful PSS synchronization, the baseband processor 322 may be operable to utilize the detected PSS, the PSS symbol timing and/or the frequency offset to perform other baseband procedures such as, for example, the SSS detection so as to acquire cell-specific parameters such as, for example, cell ID group and system parameters such as cyclic prefix (CP) length. The acquired cell-specific parameters may be used by the baseband processor 322 to ensure that the mobile device 300 communicates properly with an associated base station such as the base station 110a.

The host processor 330 may comprise suitable logic, circuitry, interfaces and/or code that may be operable to manipulate and control operation of the transceiver 320. The host processor 130 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 124 may be operable to process RF signals received via the antenna 310 over the LTE/E-UTRA air interface, for example. The received RF signals may comprise PSSs and SSSs transmitted by base stations such as the base station 110*a* and/or the base station 120*a*. The received RF signals may be converted to corresponding baseband signals and communicated with the baseband processor 322 for further baseband processing. To communicate with a particular base station such as the base station 110*a*, the baseband processor 322 may be operable to synchronize to cell specific transmission timing such as, for example, the symbol timing and frame boundary used by the base station 110*a*. In this regard, the baseband processor 322 may be operable to generate a plurality of correlation reference sequences (reference PSSs) for acquiring PSS synchronization. To acquire accurate PSS symbol timing and/or frequency offset, the baseband processor 322 may be operable to perform multiple frequency hypothesis testing. The multiple frequency hypothesis testing may start with a set of desired offsets selected within the desired frequency uncertainty range such as, for example, +/−15 ppm. The baseband processor 322 may be operable to apply one specific unique desired frequency offset to each of the MFH branches in a manner which evenly covers the entire desired frequency uncertainty range of, for example, ±15 ppm. A baseband signal associated with the received PSS may be frequency offset via frequency mixing. A PSS correlation process may be performed for each of MFH branches after frequency mixing.

A candidate PSS for the received PSS may be selected for the set of MFH branches according to corresponding resulting PSS correlation peak magnitudes in each of the MFH branches. The baseband processor 322 may be operable to detect the received PSS from the selected candidate PSSs based on the maximum PSS correlation peak magnitude across the entire set of MFH branches. A residual frequency offset may be estimated for the MFH branch with the maximum PSS correlation peak magnitude across the entire set of MFH branches using corresponding PSS correlation data. The residual frequency offset estimate may be combined with the corresponding applied or desired frequency offset in the MFH branch to determine a frequency offset estimate between the carrier frequency of the base station 110*a* and a reference or local oscillator frequency of the mobile device 300. The baseband processor 322 may be operable to adjust the reference or local oscillator frequency of the mobile device 300 according to the frequency offset estimate. The detected PSS, PSS symbol timing and/or frequency offset may be utilized in various baseband processes such as, for example, the SSS detection, for cell-specific parameters such as, for example, cell ID and antenna configuration. The use of the acquired cell-specific parameters may ensure that applications such as, for example, audio streaming run by the host processor 330 may be communicated properly with an associated base station such as the base station 110*a*.

Figure 4:
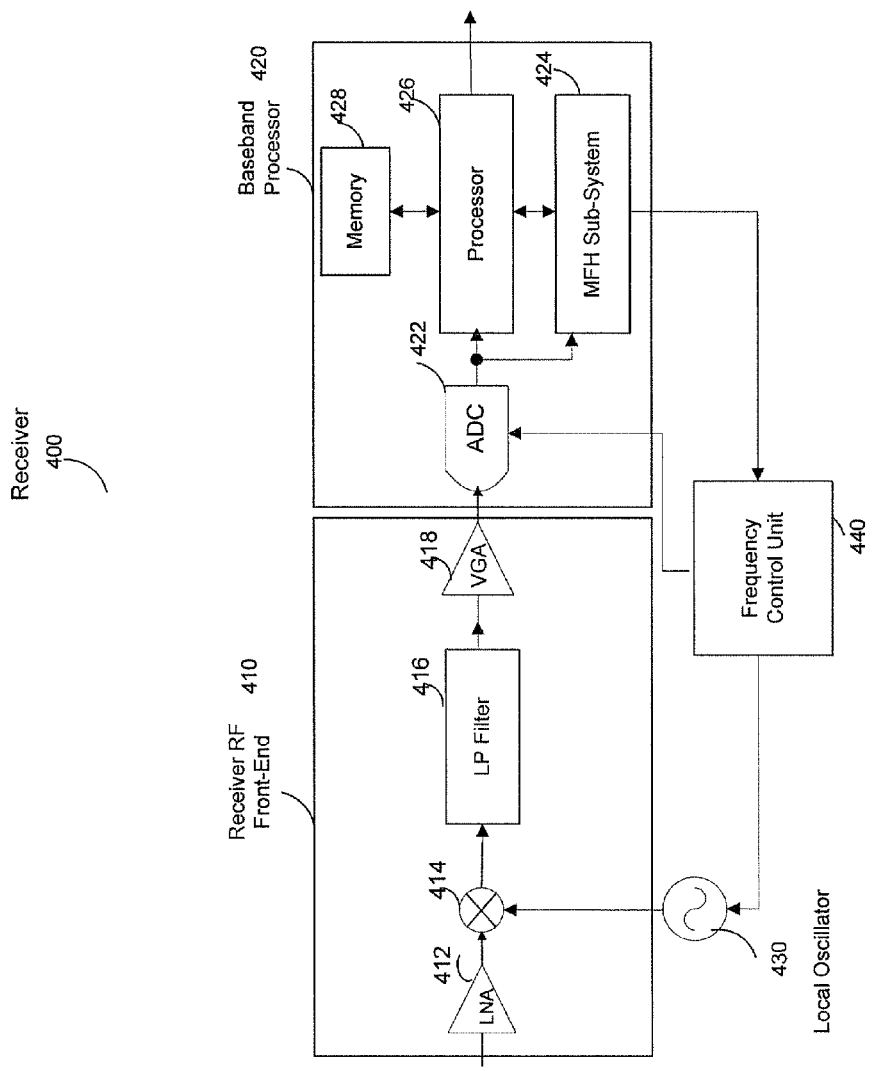
FIG. 4 is a block diagram illustrating an exemplary receiver that is operable to increase the accuracy of frequency offset estimation in multiple frequency hypothesis testing in an E-UTRA/LTE UE receiver, in accordance with an embodiment of the invention.

FIG. 4 is a block diagram illustrating an exemplary receiver that is operable to increase the accuracy of frequency offset estimation in multiple frequency hypothesis testing in an E-UTRA/LTE UE receiver, in accordance with an embodiment of the invention. Referring to FIG. 4, there is shown a receiver 400. The receiver 400 comprises a receiver radio frequency (RF) front-end 410, a baseband processor 420, a local oscillator 430 and a frequency control unit 440. The receiver RF front-end 410 comprises a low noise amplifier (LNA) 412, a mixer 414, a low pass (LP) filter 416, and a variable-gain amplifier (VGA) 418. The baseband processor 420 comprises an analog-to-digital converter (ADC) 422, a multiple frequency hypothesis sub-system 424, a processor 426 and a memory 428.

The receiver RF front-end 410 may comprise suitable logic, circuitry, interfaces and/or code that may be operable to process a RF signal received via the antenna 310. The received RF signal may comprise a PSS and a SSS. The receiver RF front-end 410 may be operable to convert the received RF signal to a corresponding baseband signal, which may be further processed by the baseband processor 420.

The LNA 412 may comprise suitable logic, circuitry, interfaces and/or code that may be operable to amplify a RF signal received by the antenna 310. The LNA 412 may be operable to essentially set a limit for how low a system noise figure may reach. The LNA 412 may be enabled to achieve a low noise performance, which is crucial for a high performance radio frequency (RF) front end.

The mixer 414 may comprise suitable logic, circuitry, interfaces and/or code that may be operable to translate the amplified RF signal from the LNA 412 to a lower, intermediate frequency (IF) signal using sinusoidal signals derived from a local oscillator 430.

The LP filter 416 may comprise suitable logic, circuitry, interfaces and/or code that may be operable to filter the IF signal from the mixer 414 so as to remove unwanted signal components.

The VGA 418 may comprise suitable logic, circuitry, interfaces and/or code that may be operable to amplify the analog baseband signal from the LP filter 416. The VGA 418 may be operable to set different gains for the analog baseband signal resulting in a variable signal level at the input to the ADC 422.

The ADC 422 may comprise suitable logic, circuitry, interfaces and/or code that may be operable to convert analog baseband signals received from the VGA 418 of the receiver RF front-end 410 to a corresponding digital baseband signal (e.g., bytes). The ADC 422 may be operable to sample the received analog baseband signal at an analog-to-digital sampling rate of, for example, 1.92 MHz, which is derived from the reference frequency provided by the reference oscillator contained in the frequency control unit 430. The resulting digital baseband signal may comprise values that are representative of the analog baseband signal amplitudes. The digital baseband signal may be communicated with the MFH sub-system 424 for acquiring correct PSS timing and/or frequency offset. The digital baseband signal may be communicated to the processor 426 for other baseband processing such as the SSS detection.

The MFH sub-system 424 may comprise suitable logic, circuitry, interfaces and/or code that may be operable to perform multiple frequency hypothesis testing for accurate PSS timing and/or frequency offset. The MFH sub-system 424 may be operable to start the multiple frequency hypothesis testing with a set of desired offsets selected within the desired frequency uncertainty range such as, for example, +/−15 ppm. The MFH sub-system 424 may be operable to place a desired frequency offset in each MFH branch. The MFH sub-system 424 may be operable to frequency offset a baseband signal for the received PSS via frequency mixing. A PSS correlation process may be performed for each of the MFH branches subsequent to frequency mixing. The MFH sub-system 424 may be operable to select a candidate PSS for the received PSS in each of the MFH branches according to a corresponding maximum PSS correlation peak magnitude. The received PSS may be detected from the selected candidate PSSs according to the maximum PSS correlation peak magnitude over the entire set of MFH branches.

The MFH sub-system 424 may be operable to estimate a residual frequency offset for the MFH branch with the maximum PSS correlation peak magnitude over the entire set of MFH branches using corresponding PSS correlation data in the MFH branch. The residual frequency offset estimation may be combined with the desired frequency offset in the MFH branch to produce a frequency offset estimate between the carrier frequency of the base station 110a and the local oscillator frequency of the receiver 400. The position of the maximum PSS correlation peak magnitude across the entire set of MFH branches may indicate the PSS symbol timing for the received PSS. The MFH sub-system 424 may be operable to communicate the detected PSS, the PSS timing and/or the frequency offset estimate to the processor 426 for other baseband processing such as the SSS detection. The MFH sub-system 424 may be operable to communicate the frequency offset estimate with the frequency control unit 440 to adjust the reference or local oscillator frequency of the receiver 400, thereby in turn adjusting the local oscillator 430 frequency and ADC 422 sampling frequency.

The processor 426 may comprise suitable logic, circuitry, interfaces and/or code that may be operable to process digital baseband signals from the ADC 422. The processor 426 may be operable to perform various baseband procedures such as the SSS detection using information such as the detected PSS, PSS symbol timing and/or frequency offset estimates from the MFH sub-system 424. For example, the processor 426 may be operable to determine SSS scrambling codes based on the detected PSS from the MFH sub-system 424. The processor 426 may be operable to descramble the SSS signals using the determined scrambling code. The processor 426 may be operable to process the descrambled SSS signals for cell ID detection. The processor 426 may be operable to determine the SSS position based on the PSS symbol timing provided by the MFH sub-system 424. The determined SSS position may indicate, for example, frame boundary of transmissions in an associated cell. The processor 426 may be operable to perform SSS decoding based on the determined SSS position for identifying cell-specific parameters such as, for example, cell ID group, reference signal sequences, and/or antenna configuration. Various system parameters such as cyclic prefix (CP) length may be identified via the SSS decoding. The identified cell-specific parameters and system parameters may ensure proper communications between the receiver 400 and an associated base station such as, the base station 110a.

The memory 428 may comprise suitable logic, circuitry, interfaces and/or code that may be operable to store information such as executable instructions and data that may be utilized by associated components such as the processor 426 in the receiver 400. The executable instructions may comprise algorithms that may be applied to various baseband procedures such as channel estimation, channel equalization, and/or channel coding. The data may comprise timing and/or frequency hypothesis. The memory 428 may comprise RAM, ROM, low latency nonvolatile memory such as flash memory and/or other suitable electronic data storage.

The local oscillator 430 may comprise suitable logic, circuitry, interfaces and/or code that may be operable to communicate with the frequency control unit 440 to provide a local oscillator frequency to the mixer 414 of the receiver 400.

The frequency control unit 440 may comprise suitable logic, circuitry, interfaces and/or code that may be operable to control the settings for the corresponding reference frequency of the local oscillator 430 and the ADC 422. The frequency control unit 440 may be operable to adjust the reference frequencies of the local oscillator 430 and the ADC 422, respectively, according to the frequency offset estimates from the MFH sub-system 424. The operation of the frequency control unit 440 may be operable to control the timing and/or the local oscillator frequency of the receiver 400.

In an exemplary operation, the receiver 400 may be operable to receive a RF signal from the antenna 310, for example. The received RF signal may comprise a PSS and a SSS. The receiver RF front-end 410 may be operable to amplify the received RF signal via the LNA 412 and convert to a baseband frequency signal via the mixer 414 and the LP filter 416, respectively. The baseband signal may be amplified via the VGA 418 and converted to a digital baseband signal via the ADC 422. The digital baseband signal may be processed by the MFH sub-system 424 for acquiring accurate PSS timing and/or frequency offset. The MFH sub-system 424 may be operable to frequency offset the digital baseband signal with a selected applied or desired frequency offset for each of the MFH branches. The resolution of the selected desired offsets may be determined based on available resources such as available memory. A PSS correlation process may be performed for each of the MFH branches and each of the MFH branches may be associated with a specific selected desired offset.

The MFH sub-system 424 may be operable to detect the received PSS according to the maximum PSS correlation peak magnitude over the entire set of MFH branches. The PSS symbol timing for the received PSS may be indicated by the position of the maximum PSS correlation peak magnitude. Residual frequency offset estimation may be performed for the MFH branch with the maximum PSS correlation peak magnitude across the entire set of MFH branches. The resulting residual frequency offset estimate may be combined with the corresponding selected applied or desired frequency offset to produce frequency offset estimate between the carrier frequency of the base station 110a and the local oscillator frequency of the receiver 400. The frequency offset estimate may be communicated with the frequency control unit 440 to signal the local oscillator 430 and the ADC 422 to adjust the corresponding reference frequencies, respectively. The detected PSS, PSS timing, and/or frequency offset estimate may be communicated to the processor 426, which may utilize them for performing other baseband procedures or functions such as the SSS detection.

Figure 5:
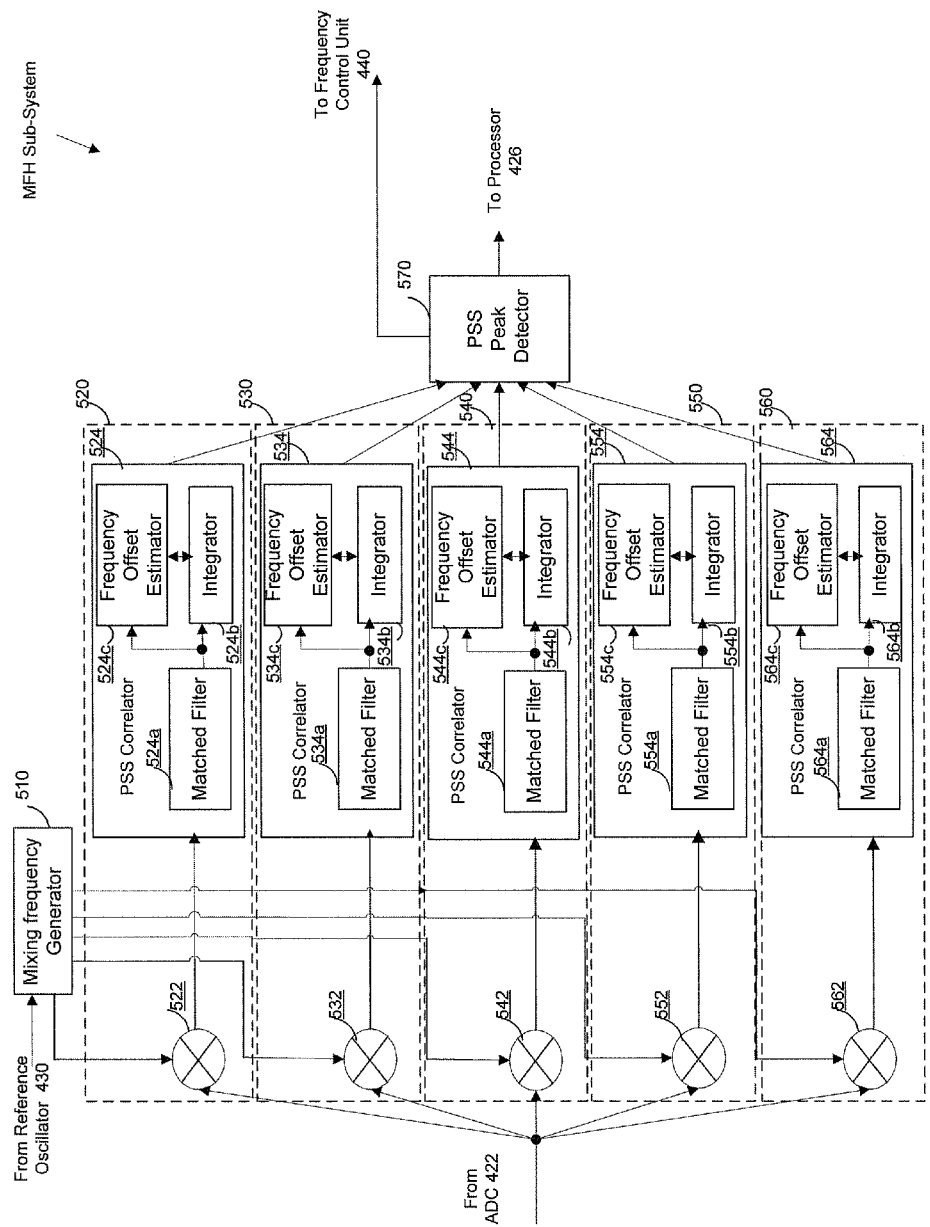
FIG. 5 is a block diagram illustrating an exemplary multiple frequency hypothesis sub-system that is operable to increase the accuracy of frequency offset estimation in an E-UTRA/LTE UE receiver, in accordance with an embodiment of the invention.

FIG. 5 is a block diagram illustrating an exemplary multiple frequency hypothesis sub-system that is operable to increase the accuracy of frequency offset estimation in an E-UTRA/LTE UE receiver, in accordance with an embodiment of the invention. Referring to FIG. 5, there is shown a MFH sub-system 500 comprising a mixing frequency generator 510, a set of MFH branches, of which MFH branches 520-560 are illustrated, and a PSS peak detector 570. A MFH branch such as the MFH branch 524 comprises a matched filter 524a, an integrator 524b and a frequency offset estimator 524c.

The mixing frequency generator 510 may comprise suitable logic, circuitry, interfaces and/or code that may be operable to generate a plurality of mixing frequencies for the set of MFH branches such as the MFH branches 520-560. The mixing frequency generator 510 may be operable to generate the plurality of mixing frequencies so as to place a desired frequency offset in a MFH branch. The number of generated mixing frequencies, i.e. the number of MFH branches, may be determined according to available system resources such as memory. The generated mixing frequencies may imply corresponding timing and/or frequency offsets. The mixing frequency generator 510 may be operable to generate the mixing frequencies such that resulting frequency offsets may be located within the desired frequency accuracy range such as, for example, +/−15 ppm. The generated mixing frequencies may be communicated to the MFH branches 520-560 where they are utilized to offset the digital baseband signal that is received from the ADC 422 so as to provide accurate timing and/or frequency offset estimation A MFH branch, such as the MFH branch 520, may comprise suitable logic, circuitry, interfaces and/or code that may be operable to perform a PSS correlation process and/or an accurate frequency offset estimation. The MFH branch 520 may be operable to offset the digital baseband signal received from the ADC 422 via the mixer 522. The MFH branch 520 may be operable to perform the PSS correlation process on the digital baseband signal with the desired offset via the PSS correlator 524. In instances where the MFH branch 520 may be associated with the maximum PSS correlation peak magnitude across the entire set of MFH branches, the MFH branch 520 may be operable to perform a residual frequency offset estimation using the resulting PSS correlation data. The residual frequency offset estimate may be combined with an applied or desired frequency offset, which is provided by a mixing frequency from the mixing frequency generator 510, to produce an accurate estimate of the frequency offset between the base station 110*a* and an associated receiver.

A mixer such as the mixer 522 may comprise suitable logic, circuitry, interfaces and/or code that may be operable to mix the digital baseband signal received from the ADC 422 with a mixing frequency from the mixing frequency generator 510. The mixing frequency may indicate the applied or desired offset selected for the MFH branch 520.

A PSS correlator such as the PSS correlator 524 may comprise suitable logic, circuitry, interfaces and/or code that may be operable to perform a correlation process to acquire PSS synchronization. The PSS correlator 524 may be operable to perform the correlation process via the matched filter 524*a* on the signal from the mixer 522. The resulting PSS correlation data may be communicated with the integrator 524*b* for identifying possible PSS timing hypothesis. In instances where the MFH branch 520 may be associated with the maximum PSS correlation peak magnitude across the entire set of MFH branches, the resulting PSS correlation data may also be communicated with the frequency offset estimator 524*c* for estimating a residual frequency offset in the MFH branch 520.

A matched filter such as the matched filter 524*a* may comprise suitable logic, circuitry, interfaces and/or code that may be operable to correlate signals from the mixer 522 with each of a plurality of local reference PSSs. The resulting PSS correlation data may be provided to the integrator 524*b* as well as the frequency offset estimator 524*c*.

An integrator such as the integrator 524*b* may comprise suitable logic, circuitry, interfaces and/or code that may be operable to accumulate the PSS correlation data from the matched filter 524*a* over a multiple slot duration, for example. Resulting PSS correlation peaks may indicate possible PSS symbol timing hypotheses under consideration. The integrator 524*b* may be operable to identify a candidate PSS according to the maximum correlation peak magnitudes. The position of the maximum correlation peak may indicate the PSS symbol timing of the identified candidate PSS in the MFH branch 520. The identified candidate PSS and PSS symbol timing may be communicated with the PSS peak detector 570 to detect the maximum received PSS peak magnitude across the entire set of MFH branches.

A frequency offset estimator such as the frequency offset estimator 524*c* may comprise suitable logic, circuitry, interfaces and/or code that may be operable to estimate a residual frequency offset in the MFH branch 520. In this regard, in instances where the MFH branch 520 may be associated with the maximum PSS correlation peak magnitude across the entire set of MFH branches, the frequency offset estimator 524*c* may be operable to estimate a residual frequency offset in the MFH branch 520 using PSS correlation data from the matched filter 524*a*. The frequency offset estimator 524*c* may be operable to combine the estimated residual frequency offset with the applied or desired frequency offset introduced at the mixer 522 to provide a frequency offset estimate between the base station 110*a* and an associated receiver.

The PSS peak detector 570 may comprise suitable logic, circuitry, interfaces and/or code that may be operable to detect the maximum received PSS correlation peaks in the MFH branches 520-560. The detected PSS may correspond to the maximum PSS correlation peak over the MFH branches 520-560. The PSS symbol timing for the detected PSS may be implied by the position of the maximum PSS correlation peak magnitude. A frequency offset associated with the MFH branch for the detected PSS may provide an overall high accuracy or resolution frequency offset estimate between the base station 110*a* and an associated receiver such as the receiver 400. The PSS peak detector 570 may be operable to communicate the resulting frequency estimate with the frequency control unit 440 to adjust reference oscillator frequency and in turn the local oscillator frequency of the receiver 400. The PSS peak detector 570 may be operable to communicate the detected PSS, associated PSS symbol timing, and/or the frequency offset estimate to the processor 426, where that may be utilized for other baseband signal processing such as the SSS detection.

In an exemplary operation, the MFH sub-system 500 may be operable to receive a corresponding digital baseband signal via processing a modulated RF carrier signal from the antenna 310, for example. The received RF signal may comprise a PSS and a SSS. The received digital baseband signal may be processed for each of the set of MFH branches for accurate timing and/or frequency offset of corresponding transmission. In each MFH branch, for example, the MFH branch 520, the digital baseband signal may be adjusted in frequency via the mixer 522. The mixer 522 may be operable to communicate with the mixing frequency generator 510 for a specific mixing frequency. The specific mixing frequency may imply a desired frequency offset to the digital baseband signal in the MFH branch 520. The mixing frequency may be selected such that the resulting desired frequency offset may be located within the desired frequency accuracy range such as, for example, +/−15 ppm. A PSS correlation process may be performed by the PSS correlator 524 on the signal from the mixer 522. The matched filter 524*a* may be operable to correlate the received signal with each of a plurality of local reference PSSs. Resulting correlation data may be communicated with the integrator 524*b* and the frequency offset estimator 524*c*, respectively.

The integrator 524*b* may be operable to accumulate the PSS correlation data from the matched filter 524*a* over a duration of multiple slots, for example. Resulting correlation peaks may imply possible PSS symbol timing hypotheses under consideration. A candidate PSS for the received PSS may be identified in the MFH branch 520 based on the maximum PSS correlation peak magnitude in the MFH branch 520. The received PSS may be detected from the identified candidate PSSs across the entire set of MFH branches 520-560 according to the maximum correlation peak magnitude. The position of the maximum PSS correlation peak magnitude may indicate PSS symbol timing of the detected PSS. In instances where the MFH branch 520 may be associated with the maximum PSS correlation peak magnitude across the entire set of MFH branches, the frequency offset estimator 524c may be operable to utilize the PSS correlation data received from the matched filter 524a to estimate a residual frequency offset. The frequency offset estimator 524c may be operable to combine the estimated residual frequency offset with the applied or desired frequency offset in the MFH 520 to provide a frequency offset estimate between the base station 110a and the receiver 400. The PSS peak detector 570 may be operable to communicate the detected PSS, PSS symbol timing, and/or frequency offset with the frequency control unit 440 and the processor 426 for frequency control and further baseband processing, respectively.

Figure 6:
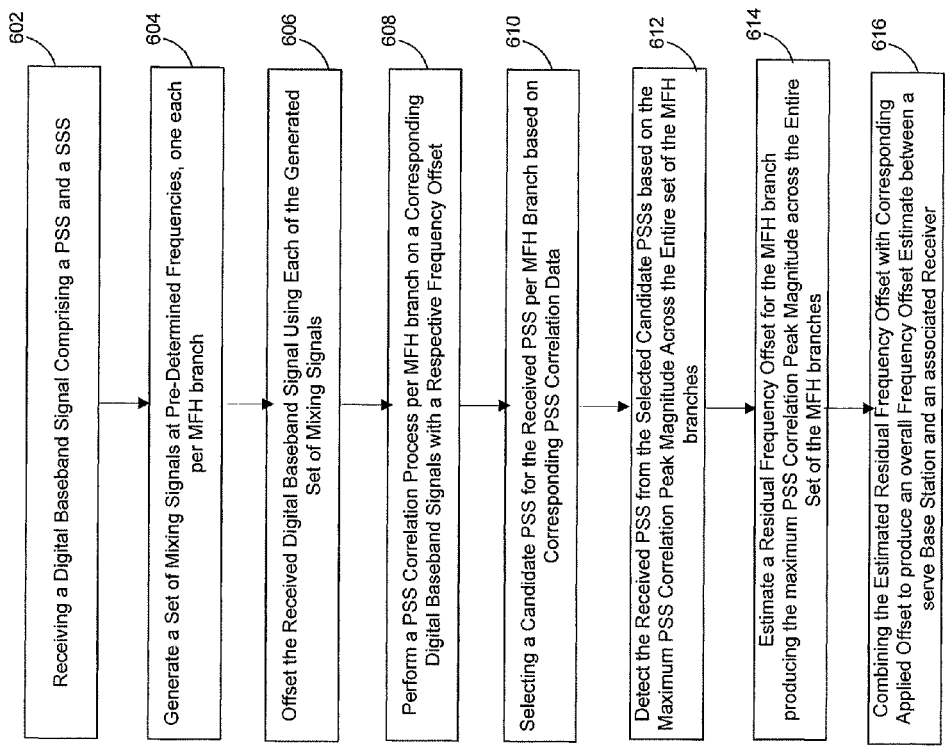
FIG. 6 is a flow chart illustrating an exemplary procedure that is utilized to increase the accuracy of frequency offset estimation in multiple frequency hypothesis testing in an E-UTRA/LTE UE receiver, in accordance with an embodiment of the invention.

FIG. 6 is a flow chart illustrating an exemplary procedure that is utilized to increase the accuracy of frequency offset estimation in multiple frequency hypothesis testing in an E-UTRA/LTE UE receiver, in accordance with an embodiment of the invention. The exemplary steps may start with the step 602. In step 602, the RF RX front-end 324 may be operable to receive a RF signal over, for example, the LTE/E-UTRA air interfaces and to produce a digital baseband signal after down-conversion, filtering and sampling. The received RF signal may comprise a PSS and a SSS. A corresponding digital baseband signal may be derived from the received RF carrier signal and communicated with the MFH sub-system 424 for acquiring accurate PSS timing and/or frequency offset of the received baseband signal. In step 604, the MFH sub-system 424 may be operable to determine a set of desired frequency offsets based on available system resources such as available memory of the mobile device 300. Each of the determined desired frequency offsets may be applied to each of the MFH branches, respectively. In step 606, the MFH sub-system 424 may be operable to offset the frequency of the digital baseband signal from the ADC 422 for each of the MFH branches according to corresponding desired frequency offset.

In step 608, the MFH sub-system 424 may be operable to perform a PSS correlation process for each of the MFH branches on a corresponding digital baseband signal after frequency mixing. For example, the PSS correlator 524 may be operable to perform a PSS correlation process on the signal from the mixer 522. In step 610, a candidate PSS for the received PSS may be selected for each of the set of MFH branches according to corresponding PSS correlation peak magnitudes. For example, a candidate PSS in the MFH branch 520 may be selected by the integrator 524b based on the maximum resulting PSS correlation peak magnitude of the PSS correlation data from the matched filter 524a. In step 612, the received PSS may be detected according to the maximum PSS correlation peak magnitude over the entire set of MFH branches via the PSS peak detector 570 from the selected candidate PSSs. In step 614, a residual frequency offset may be estimated for a MFH branch producing the maximum PSS correlation peak magnitude across the entire set of MFH branches using the corresponding PSS correlation data. For example, in instances where the MFH branch 520 may be associated with the maximum PSS correlation peak magnitude across the set of entire set of MFH branches, the frequency offset estimator 524c may be operable to estimate a residual frequency offset using PSS correlation data from the matched filter 524a. In step 616, the estimated residual frequency offset may be combined with corresponding applied or desired frequency offset in the MFH branch 520 to provide a frequency offset estimate between the base station 110a and an associated receiver such as the receiver 400, for example.

In various exemplary aspects of the method and system for increasing the accuracy of frequency offset estimation in multiple frequency hypothesis testing in an E-UTRA/LTE UE receiver, a mobile device such as the mobile device 114 may be operable to receive a radio frequency (RF) signal from the base station 110a. The received RF signal may comprise a PSS and a SSS. The received PSS and SSS may be used by the mobile device 114 to acquire cell-specific parameters via the PSS synchronization and the SSS detection, respectively. In order to overcome or mitigate uncertainties related to the correct PSS symbol timing and/or the correct frequency offset for the received PSS, the mobile device 114 may be operable to perform multiple frequency hypothesis (MFH) testing via the MFH sub-system 424.

The MFH sub-system 424 may be operable to perform the MFH testing using a set of MFH branches such as the MFH branches 520-560. The mobile device 114 may be operable to perform a PSS correlation process for each of the MFH branches 520-560. For example, in the MFH branch 520, a PSS correlation process may be performed via the PSS correlator 524. The matched filter 524a may be operable to correlate a baseband signal of the received PSS with each of local reference PSSs. The resulting correlation data at the output of the matched filter 524a may be utilized for estimating carrier frequency offset for receiving data from, for example, the base station 110a. As described with respect to FIG. 5, the frequency offset estimation may be performed using corresponding PSS correlation data for a MFH branch producing a maximum PSS correlation peak magnitude across the set of MFH branches such as the MFH branches 520-560. The MFH sub-system 424 may be operable to determine a desired offset for each of the MFH branches 520-560. The baseband signal of the received PSS may be offset for each of the MFH branches by utilizing a mixer such as the mixer 522 based on corresponding desired frequency offset. The PSS correlation processing may be performed after the baseband signal of the received PSS has been offset.

In each of the MFH branches 520-560 such as the MFH branch 520, the integrator 524b may be operable to select a candidate PSS for the received PSS based on the resulting PSS correlation peaks. The selected candidate PSSs may be communicated to the PSS peak detector 570. The PSS peak detector 570 may be operable to detect the received PSS from the identified candidate PSSs across the entire set of MFH branches 520-560. The detected PSS may be associated with the maximum PSS correlation peak magnitude across the entire set of MFH branches. A residual frequency offset may be estimated for the MFH branch producing the maximum PSS correlation peak magnitude across the set of MFH branches such as the MFH branches 520-560. The estimated residual frequency offset may be combined with a corresponding (applied) desired offset for the MFH branch so as to provide a frequency offset estimate between the base station 110a and the mobile device 300, for example. The PSS peak detector 570 may be operable to communicate the frequency offset estimate to the processor 426 for further baseband processing. The frequency offset estimate may be fed back to the frequency control unit 440. The frequency control unit 440 may be operable to control and/or adjust a reference oscillator frequency of the oscillator 430 based on the frequency offset estimate.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for increasing the accuracy of frequency offset estimation in multiple frequency hypothesis testing generating in an E-UTRA/LTE UE receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
   receiving a radio frequency (RF) signal comprising a primary synchronization sequence (PSS) and a secondary synchronization sequence (SSS);
   generating PSS correlation data for each multiple frequency hypothesis (MFH) branch of a set of MFH branches;
   determining a maximum PSS correlation peak in said PSS correlation data;
   estimating a residual frequency offset for said RF signal a MFH branch producing said maximum PSS correlation peak; and
   estimating a frequency offset for said RF signal by combining said estimated residual frequency offset with a frequency offset associated with said MFH branch producing said maximum PSS correlation peak.

2. The method according to claim 1, further comprising:
   determining a desired offset for each MFH branch of said set of MFH branches.

3. The method according to claim 2, further comprising:
   frequency offsetting a baseband signal of said RF signal for each MFH branch of said set of MFH branches based on said determined desired offset.

4. The method according to claim 3, further comprising:
   generating said PSS correlation data after said frequency offsetting said baseband signal.

5. The method according to claim 4, further comprising:
   selecting a candidate PSS for each MFH branch of said set of MFH branches based on identifying a maximum branch PSS correlation peak in each MFH branch.

6. The method according to claim 5, further comprising detecting a received PSS of said received RF signal, from said candidate PSS of each MFH branch, by determining a maximum candidate PSS, wherein said maximum candidate PSS contains said maximum PSS correlation peak.

7. The method according to claim 1, further comprising:
   baseband processing said RF signal using said estimated frequency offset.

8. The method according to claim 1, further comprising:
   adjusting a local reference oscillator frequency of a mobile device based on said estimated frequency offset.

9. A system for communication, comprising:
   an input port configured to receive a radio frequency (RF) signal comprising a primary synchronization sequence (PSS) and a secondary synchronization sequence (SSS);
   a plurality of multiple frequency hypothesis (MFH) branches coupled to said input port, wherein each MFH branch is configured to:
   generate PSS correlation data,
   estimate a residual frequency offset for said RF signal, and
   estimate a frequency offset for said received RF signal by combining said estimated residual frequency offset with a desired frequency offset; and
   a peak detector coupled to said MFH branches, wherein said peak detector is configured to determine a detected PSS by determining a maximum PSS correlation peak in said PSS correlation data from each MFH branch.

10. The system according to claim 9, further comprising:
    a mixing frequency generator coupled to said MFH branches, wherein said mixing frequency generator is configured to place the desired frequency offset in said MFH branches.

11. The system according to claim 10, wherein said MFH branches are further configured to frequency offset a baseband signal of said RF signal based on said desired frequency offset.

12. The system according to claim 11, wherein said MFH branches are further configured to generate said PSS correlation data after said frequency offsetting said baseband signal.

13. The system according to claim 12, wherein said MFH branches are further configured to select a candidate PSS based on identifying a maximum branch PSS correlation peak in each MFH branch.

14. The system according to claim 9, wherein said peak detector is further configured to communicate said detected PSS to baseband signal processing circuitry.

15. The system according to claim 9, wherein said peak detector is further configured to initiate an adjustment of a local reference oscillator frequency based on said estimated frequency offset.

16. A method for communication, comprising:
    receiving a radio frequency (RF) signal comprising a primary synchronization sequence (PSS) and a secondary synchronization sequence (SSS);
    generating PSS correlation data for each multiple frequency hypothesis (MFH) branch of a set of MFH branches;
    determining a maximum PSS correlation peak in said PSS correlation data;
    estimating a residual frequency offset for said RF signal in a MFH branch producing said maximum PSS correlation peak;
    estimating a frequency offset for said RF signal by combining said estimated residual frequency offset with a frequency offset associated with said MFH branch producing said maximum PSS correlation peak; and
    initiating an adjustment of a reference oscillator of a communications device based on said frequency offset.

17. The method of claim 16, further comprising:
determining a desired offset for each MFH branch of said set of MFH branches.

18. The method of claim 17, further comprising frequency offsetting a baseband signal of said RF signal for each MFH branch of said set of MFH branches based on said determined desired offset.

19. The method of claim 18, further comprising selecting a candidate PSS for each MFH branch of said set of MFH branches based on identifying a maximum branch PSS correlation peak in each MFH branch.

20. The method of claim 19, further comprising detecting a received PSS of said received RF signal, from said candidate PSS of each MFH branch, by determining a maximum candidate PSS, wherein said maximum candidate PSS contains said maximum PSS correlation peak.

* * * * *